United States Patent [19]
Koivunen

[11] 3,814,222
[45] June 4, 1974

[54] DIFFERENTIAL AND BRAKE ASSEMBLY WITH PARKING BRAKE FOR DIFFERENTIAL OUTPUTS

[75] Inventor: Erkki A. Koivunen, Livonia, Mich.

[73] Assignee: General Motors Corporation, Detroit, Mich.

[22] Filed: Jan. 29, 1973

[21] Appl. No.: 327,707

[52] U.S. Cl. ............. 192/4 A, 74/710.5, 188/264 P
[51] Int. Cl. ............................................ F16h 57/10
[58] Field of Search ............... 192/4 A; 74/710.5; 188/264 P

[56] References Cited
UNITED STATES PATENTS
3,323,389  6/1967  Hause ............................. 74/710.5
3,300,001  1/1967  Stockton ......................... 192/4 A Primary Examiner—Benjamin W. Wyche
Assistant Examiner—John Reep
Attorney, Agent, or Firm—D. D. McGraw

[57] ABSTRACT

A final drive differential and brake mechanism for a vehicle in which the differential has two outputs, one for each drive axle, and a disc brake pack is arranged to brake both outputs to provide a service brake vehicle. In one embodiment, the outputs also have disc plates cooperating with pawls providing a parking brake arrangement. In another embodiment, the disc pack is mechanically actuated to provide a parking brake. The disc pack is liquid cooled and a cooling liquid pump is driven by the differential output through a gear arrangement which provides a stepped up speed for the pump.

4 Claims, 4 Drawing Figures

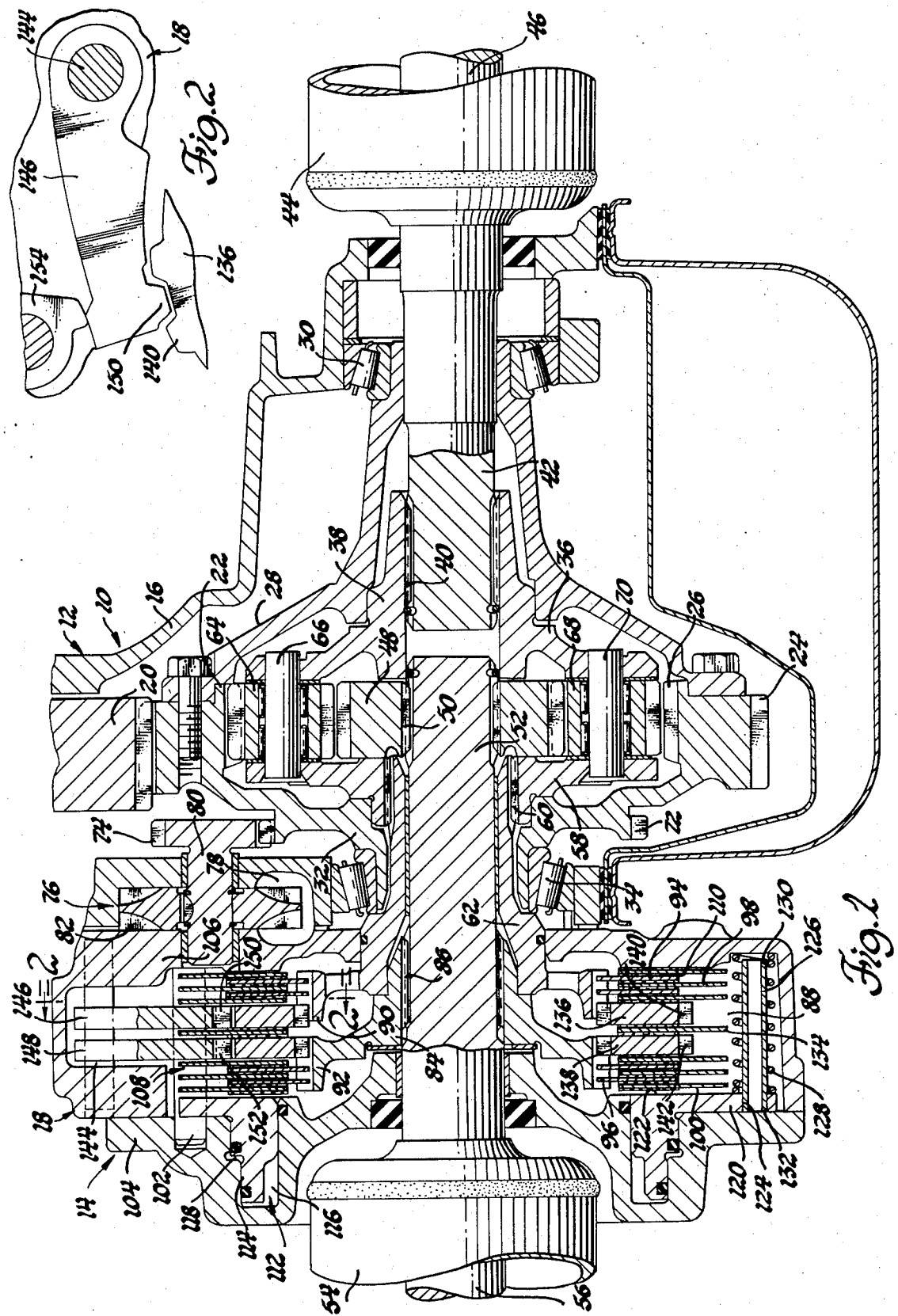

DIFFERENTIAL AND BRAKE ASSEMBLY WITH PARKING BRAKE FOR DIFFERENTIAL OUTPUTS

The invention relates to the mechanism disclosed in U.S. Pat. No. 3,323,389, entitled "Live Axle," issued June 6, 1967, and assigned to the common assignee. In that disclosure, a cooling liquid pump is driven by one of the differential outputs, and no parking brake arrangement is provided for either of the outputs.

The invention also relates to an arrangement by which the entire disc pack may be operated mechanically to provide a parking brake mode.

IN THE DRAWINGS

FIG. 1 is a cross-section view, with parts broken away, illustrating a mechanism embodying the invention.

FIG. 2 is a fragmentary view of one of the parking brake pawls and its cooperating actuating cam and disc plate, taken in the direction of arrows 2—2 of FIG. 1.

Figure 4:
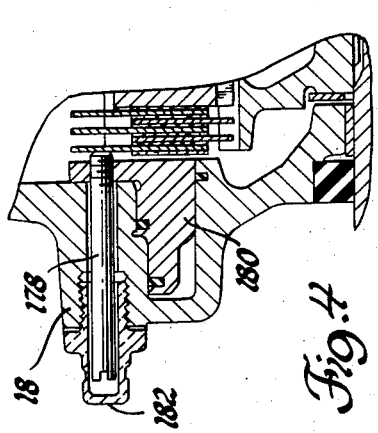
FIG. 4 is a fragmentary view with parts broken away and in section and illustrating a disc pack wear indicator mechanism for the disc pack portion of the assembly embodying the invention.

As shown in FIG. 1, the mechanism provides the live axle of a vehicle with the vehicle engine being closely associated with the live axle. Such an arrangement may be utilized to provide a front wheel drive vehicle. The mechanism 10 includes the differential assembly 12 and the brake assembly 14. The mechanism housing has a differential housing section 16 and a brake housing section 18. The housing is suitably secured to the vehicle in which the mechanism is installed. A drive pinion 20 which receives power from the vehicle engine drives the input ring gear 22 of the differential assembly, the ring gear having teeth 24 formed on its outer periphery for this purpose. The ring gear also has ring gear teeth 26 formed on its inner periphery. A ring gear hub 28 is bolted to the ring gear and extends so as to be rotatably mounted by bearing 30 in the differential housing 16. Another ring gear hub 32 extends in the opposite direction from the hub 28 so as to be rotatably mounted in the mechanism housing by bearing 34. Planetary carrier 36 provides a first differential output member and has a hub 38 connected by splines 40 to the rotatable output shaft 42, this shaft being the right output shaft as viewed in FIG. 1. Shaft 42 extends through the ring gear hub 28 and connects with the hub 44 which provides a universal joint housing to which the right live axle 46 is drivingly connected by means of a universal joint.

The differential assembly is of the double pinion planetary gear set type. It has a sun gear 48 which is connected by splines 50 to the left rotatable output shaft 52. This shaft extends leftwardly through the ring gear hub 32 and out of the brake housing section 18, terminating in the hub 54. Hub 54 forms a universal joint housing providing a drive to the left live axle 56.

The carrier 36 has a leftwardly extending hub 58 which is connected by splines 60 to the inner brake hub 62, which also extends through ring gear hub 32 and into the brake housing section 18. The differential has a first set of pinions 64 rotatably mounted on pins 66 of carrier 36 and providing outer planetary gears which mesh with ring gear teeth 26. A second set of pinions 68 rotatably mounted on pins 70 of carrier 36 provides inner planetary gears which mesh with the first pinions 64 and with sun gear 48. In a preferred form there is a two-to-one ratio between the ring gear 22 and the sun gear 48 and pinions 64 and 68 have the same number of teeth.

The ring gear hub 32 has a pump drive gear 72 formed on its outer side. Gear 72 meshes with the pump shaft gear 74 of the cooling liquid pump 76. This pump is rotatably mounted in a chamber 78 formed in housing 16 and covered by brake housing 18. The pump includes a shaft 80 driven by gear 74 and having a pump impeller 82 mounted thereon and cooperating with suitable passages and sections of chamber 78 to circulate cooling liquid through the brake so long as the ring gear 22 is rotating.

An outer brake hub 84 is connected to the left rotatable output shaft 52 by splines 86. The brake housing section 18 is constructed to provide a brake chamber 88. The inner and outer brake hubs 62 and 84 have splined flanges 90 and 92 which extend into chamber 88 and provide mountings for a first set of rotatable brake discs 94 and a second set of rotatable brake discs 96, respectively. A first set of rotatably fixed brake discs 98 and a second set of rotatably fixed brake discs 100 are mounted on pins 102 which join the opposite sides 104 and 106 of brake housing section 18. The rotatably fixed brake discs and the rotatable brake discs are interleaved to provide a disc pack 108. The side surface of housing side 106 facing chamber 88 provides a backing plate surface 110 for the disc pack.

An annular chamber 112 formed in housing side 104 contains an axially movable annular brake apply piston 114 which when actuated by hydraulic pressure in chamber 112 moves to engage and compress the disc pack so as to provide friction braking action. Chamber 112 is divided into two sections 116 and 118 so that separate brake actuating circuits may be connected to actuate piston 114. The piston has a radially extending flange 120, the face 122 of the flange and piston engaging the adjacent rotatably fixed plate when the brakes are actuated. The outer periphery of flange 120 is notched to fit about pins 102 and prevent rotation of the piston when the brake is applied.

At circumferentially spaced positions relative to pins 102 the flange 120 is provided with a series of apertures 124 which receive adjuster tubes 126 in a sliding but restrictive manner. Piston return springs 128 fit about tubes 126 and are in slightly compressed relation when the brake is released, the spring ends respectively seating on flange 120 and backing plate side 106. Tubes 126 are slightly shorter than the distance between sides 104 and 106, the amount depending upon the amount of piston travel to be permitted before adjustment takes place. As the piston 104 is moved to apply the brake, springs 128 are compressed and tubes 126 move with the piston so that their right ends 130 move toward engagement with side 106. If sufficient wear has occurred to the brake plate friction linings, piston 104 will move sufficiently far to engage tube ends 130 with side 106 and then to slide the piston on the tubes at apertures 124. Since this is a restrictive fit, the tubes will assume a new position relative to the piston flange, so that tube left ends 132 will extend slightly out of the flange toward housing side 104. When the pressure is released in chamber 112, springs 128 will return the piston leftwardly until tube ends 132 engage side 104, establishing a new piston brake release position. The force exerted by springs 128 is insufficient to overcome the restrictive fit force between the disc flange apertures 124 and the tubes 126, so that the new position is maintained.

The disc plate sets 94 and 96 are separated by a separator disc 134, which is a rotatably fixed disc similar to the discs 98 and 100. The adjacent rotatable disc plates 136 and 138 are respectively parts of the disc sets 94 and 96 and are separated by separator disc 134. Disc plates 136 and and 138 are preferably somewhat thicker than the other rotatable disc plates, are also slidably splined to their respective brake hub splined flanges 90 and 92, and have their outer peripheries respectively provided with teeth 140 and 142. A pin 144 extending across the outer periphery of a portion of of brake chamber 88 provides a pivotal mount for a pair of parking brake pawls 146 and 148. The pawls are respectively provided with teeth 150 and 152 which can be engaged and disengaged from the teeth 140 and 142, respectively, of disc plates 136 and 138. An actuating cam 154 is mounted on brake housing 18 so that it may be rotatably moved by suitable means, such as a cable and lever arrangement, not shown, to pivot pawls 146 and 148 into the engaged position with the disc plate teeth, and to permit the pawls to be disengaged by a spring when the parking brake is released. Thus when the parking brake mechanism is actuated, both pawls lock both disc plates 136 and 138 against rotation, thereby locking brake hubs 62 and 84 against rotation, and thereby locking shafts 42 and 52 against rotation. Thus the vehicle wheels to which axles 46 and 56 are attached are prevented from rotating.

Figure 3:
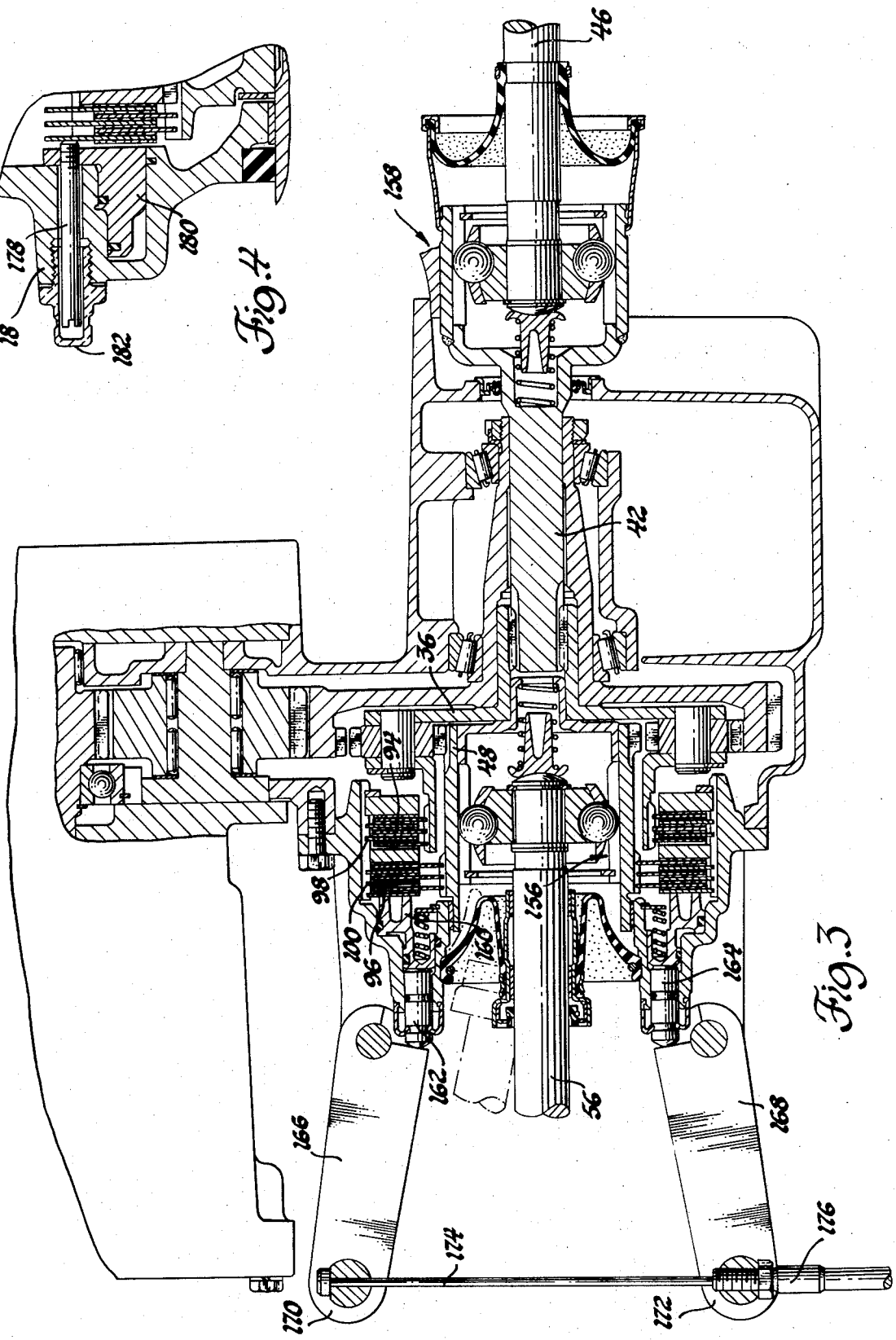
FIG. 3 is a view similar to FIG. 1 showing a modification embodying the invention.

The modified construction shown in FIG. 3 has a generally similar differential drive arrangement with one rotatable set of disc plates 94 being attached to the carrier 36 and the other set of rotatable disc plates 96 being attached to the sun gear 48. The sun gear 48 drives the axle 56 through the universal joint 156, and the carrier 36 drives the axle shaft 46 through shaft 42 and universal joint 158. The piston 160, which actuates the brake under influence of hydraulic pressure, has a pair of exposed extensions 162 and 164 which extend outwardly of the brake housing section 18. Brake apply levers 166 and 168 are pivoted on housing 18 and engage the ends of extensions 162 and 164 so that movement of the levers will cause the piston 160 to be moved. The lever outer ends 170 and 172 are respectively connected to a push-pull cable 174 and the cable sheath and reaction member 176. By exerting brake apply force on the sheath and the cable, levers 166 and 168 are pivoted and act to move piston 160 into mechanical engagement with the disc pack so that the non-rotatable discs 98 and 100 and the rotatable discs 94 and 96 act to brake the carrier 36 and the sun gear 48. This braking action is transferred to the axles 46 and 56 to brake the vehicle.

FIG. 4 shows a wear indicator rod 178 which is attached to piston 180 and projects through the brake housing section 18 and into a transparent cap 182 so that it is visible upon inspection. The position of this rod in relation to marks on the cap indicates the total amount of brake friction surface wear as the piston 180 is repositioned during brake release by means of the adjuster mechanism shown in FIG. 1. As can be seen, piston 180 is comparable to piston 114 of FIG. 1.

A brake and differential final drive mechanism has been disclosed which includes a disc brake pack acting on both differential outputs to brake the output axles, an adjuster mechanism for the disc pack actuating piston, a wear indicator for the disc pack, and a parking brake arrangement acting on at least some of the disc plates which rotate with the differential outputs. The parking brake is either positive in nature, as when pawls of FIG. 1 are used, or frictional in nature when the parking brake arrangement of FIG. 3 is used.

What is claimed is:

1. In an axle assembly including a final drive, a differential having an input member driven by said final drive, and first and second output members; first and second opposed axles extending in opposite directions from said differential and respectively connected in driving relation with said first and second output members; and brake means comprising a series of rotationally fixed discs and first and second series of rotatable discs respectively operatively driven by said first and second output members and interleaved with said series of rotationally fixed discs, and a brake actuator member operatively connected to said discs for compressing said discs and actuating the same in braking action;

the improvement comprising first and second disc plates which are the two adjacent discs of said first and second series of rotatable discs, each of said first and second disc plates having circumferentially spaced teeth formed thereon and first and second pawls positioned for engagement and disengagement with said teeth and having a common actuator, thereby providing a parking brake locking said axles against rotation when so engaged.

2. A differential drive and brake assembly comprising:

a fixed housing;

a differential in said housing including an input ring gear, a sun gear providing a first output member, a planetary carrier providing a second output member, outer planetary gears rotatably mounted on said carrier, and intermeshed with said ring gear, and inner planetary gears rotatably mounted on said carrier and intermeshed with said outer planetary gears and said sun gear;

a disc brake assembly in said housing including a disc pack chamber having rotatably fixed disc plates therein and a first set of rotatable disc plates operatively connected to said sun gear and a second set of rotatable disc plates operatively connected to said carrier, said rotatable disc plates being interleaved with said rotatably fixed disc plates, a disc brake actuator when actuated pressing said disc plates into friction braking relation, parking brake means including rotatably fixed means selectively engaging at least one of each of said rotatable disc plates of each of said rotatable disc plate sets in a mechanical braking relation, and liquid cooling means for said brake assembly comprising a cooling liquid pump housed in said housing adjacent said disc pack chamber and having a drive shaft and gear driven by a drive gear on said ring gear and driving a pump impeller at a rotational speed greater than the rotational speed of said ring gear.

3. The assembly of claim 2, said parking brake means rotatably fixed means including at least some of said rotatably fixed disc plates.

4. The assembly of claim 2, said parking brake means rotatably fixed means including parking pawl means pivotally movable to engage and disengage adjacent rotatable disc plates, one of which is in said first set and the other of which is in said second set of rotatable disc plates.

* * * * *